US012681706B2

(12) United States Patent
Martiel et al.

(10) Patent No.: US 12,681,706 B2
(45) Date of Patent: Jul. 14, 2026

(54) METHOD FOR COMPILING A PROGRAM FOR QUANTUM COMPUTER

(71) Applicant: BULL SAS, Les Clayes sous Bois (FR)

(72) Inventors: Simon Martiel, Versailles (FR); Arnaud Gazda, Versailles (FR)

(73) Assignee: BULL SAS, Les Clayes sous Bois (FR)

( * ) Notice: Subject to any disclaimer, the term of this patent is extended or adjusted under 35 U.S.C. 154(b) by 737 days.

(21) Appl. No.: 18/134,137

(22) Filed: Apr. 13, 2023

(65) Prior Publication Data

US 2024/0354080 A1 Oct. 24, 2024

(51) Int. Cl.
| | |
|---|---|
| *G06N 10/80* | (2022.01) |
| *G06F 8/41* | (2018.01) |
| *G06N 10/20* | (2022.01) |

(52) U.S. Cl.
CPC ............. *G06F 8/443* (2013.01); *G06N 10/20* (2022.01); *G06N 10/80* (2022.01)

(58) Field of Classification Search
CPC ......... G06F 8/443; G06N 10/80; G06N 10/20
See application file for complete search history.

(56) References Cited

U.S. PATENT DOCUMENTS

| | | | |
|---|---|---|---|
| 11,062,079 B2 | 7/2021 | Marteil et al. | |
| 11,494,681 B1* | 11/2022 | Peterson | ................. G06F 15/16 |
| 2017/0308803 A1* | 10/2017 | Wallman | ............... G06F 11/004 |
| 2023/0196156 A1* | 6/2023 | Chen | ...................... G06N 10/20 |
| | | | 706/62 |

FOREIGN PATENT DOCUMENTS

| | | | | |
|---|---|---|---|---|
| CN | 113918168 A | * | 1/2022 | ............. G06N 10/00 |
| CN | 113934431 A | * | 1/2022 | ............. G06F 8/447 |
| EP | 3929827 A1 | | 12/2021 | |

OTHER PUBLICATIONS

European Search report for corresponding EP Application No. 22305532, dated Sep. 27, 2022.
Martiel et al., "Qubit routing via lazy synthesis", , XP055959847, Retrieved from the Internet: URL:https://arxiv.org/pdf/2012.09663v2.pdf [retrieved on Sep. 12, 2022], pp. 1-31, Nov. 8, 2021.

* cited by examiner

*Primary Examiner* — Casey R. Garner
(74) *Attorney, Agent, or Firm* — Meagher, Emanuel, Laks, Goldberg & Liao, LLP

(57) ABSTRACT

A computer-implemented method for compiling a program to be executed using a quantum computer combines final Clifford stripping and initial Clifford stripping. The method allows reducing a performance cost of the program, in particular reducing a number of entangling gates that are used within the quantum computer. A rate of errors in the execution of the program can thus be reduced. The method can be implemented for calculating an observable value or for sampling a bit string.

11 Claims, 5 Drawing Sheets

Algorithm 1 CliffordStrip algorithm with energy sampling

1: procedure CLIFFORDSTRIP($\mathcal{A}, \mathcal{B}, N$)
2: $C_I \leftarrow \mathbb{I}_n$
3: $C_F \leftarrow \mathbb{I}_n$
4: $solutions \leftarrow [\,]$
5: while $|solutions| < N$ do
6: $C_1, U_1 = \mathcal{A}(U)$
7: $C_2, U_2 = \mathcal{A}(U_1^\dagger)$
8: $C_F \leftarrow C_F \cdot C_1$
9: $C_I \leftarrow C_I \cdot C_2$
10: $U \leftarrow U_2^\dagger$
11: $solutions.push((C_I, U, C_F, |\mathcal{B}(C_I^\dagger)| + |U|))$
12: end while
13: $C_I, U, C_F, \_ \leftarrow min(solutions)$ ▷ solutions are compared using their last components
14: return $\mathcal{B}(C_I^\dagger) :: U$ ▷ :: stands for circuit concatenation
15: end procedure

---

Figure 1:
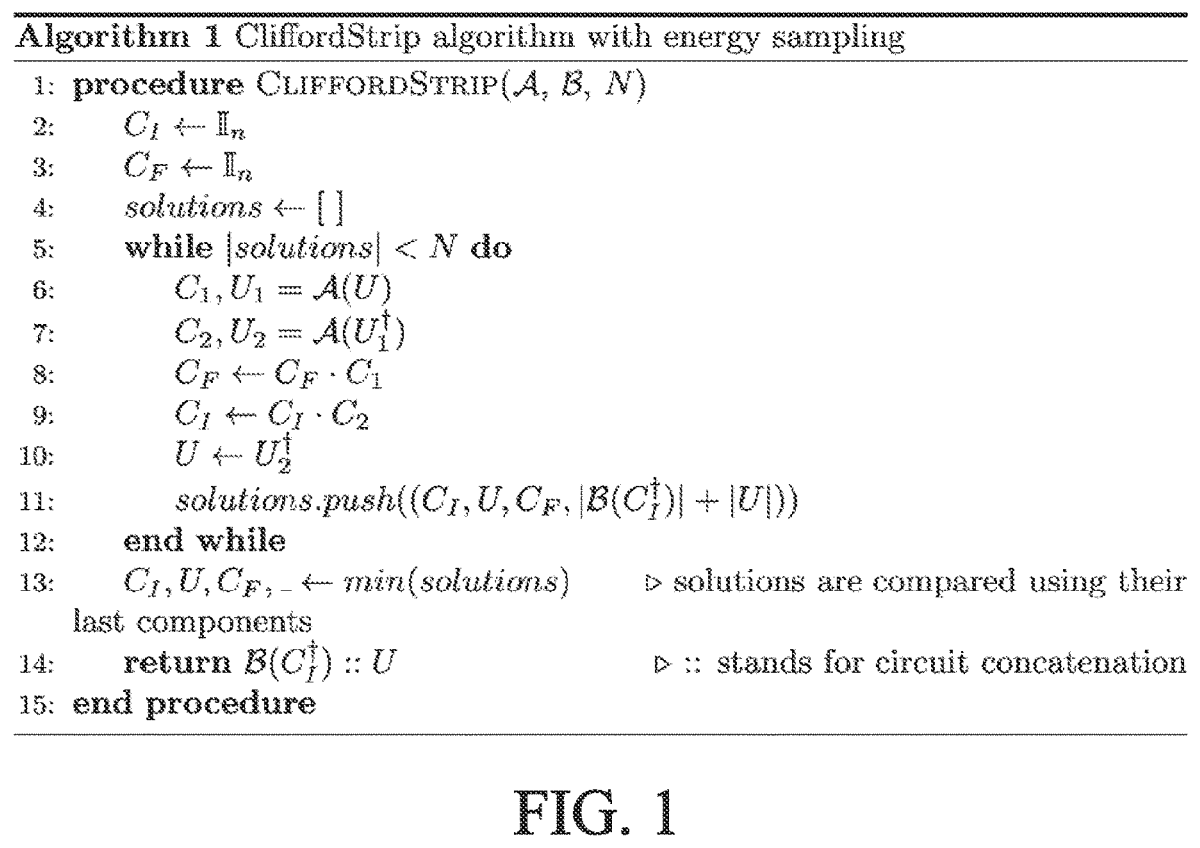

Algorithm 1 CliffordStrip algorithm with energy sampling

---

1:  procedure $\text{CLIFFORDSTRIP}(\mathcal{A}, \mathcal{B}, N)$
2:      $C_I \leftarrow \mathbb{I}_n$
3:      $C_F \leftarrow \mathbb{I}_n$
4:      $solutions \leftarrow [\,]$
5:      while $|solutions| < N$ do
6:          $C_1, U_1 = \mathcal{A}(U)$
7:          $C_2, U_2 = \mathcal{A}(U_1^\dagger)$
8:          $C_F \leftarrow C_F \cdot C_1$
9:          $C_I \leftarrow C_I \cdot C_2$
10:         $U \leftarrow U_2^\dagger$
11:         $solutions.push((C_I, U, C_F, |\mathcal{B}(C_I^\dagger)| + |U|))$
12:     end while
13:     $C_I, U, C_F, \_ \leftarrow min(solutions)$       $\triangleright$ solutions are compared using their last components
14:         return $\mathcal{B}(C_I^\dagger) :: U$       $\triangleright$ :: stands for circuit concatenation
15: end procedure

Figure 3:
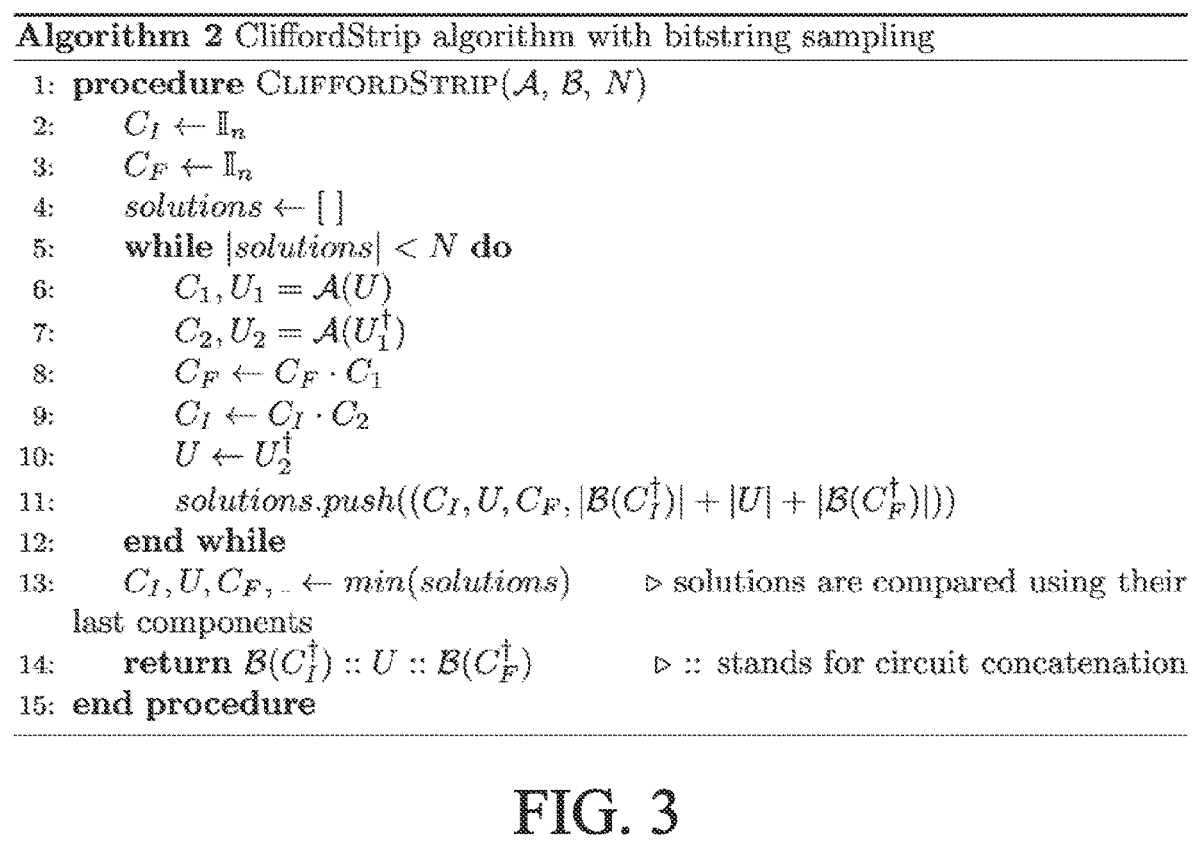

Algorithm 2 CliffordStrip algorithm with bitstring sampling

---

1: procedure CLIFFORDSTRIP$(\mathcal{A}, \mathcal{B}, N)$
2:     $C_I \leftarrow \mathbb{I}_n$
3:     $C_F \leftarrow \mathbb{I}_n$
4:     $solutions \leftarrow [\,]$
5:     while $|solutions| < N$ do
6:         $C_1, U_1 = \mathcal{A}(U)$
7:         $C_2, U_2 = \mathcal{A}(U_1^\dagger)$
8:         $C_F \leftarrow C_F \cdot C_1$
9:         $C_I \leftarrow C_I \cdot C_2$
10:        $U \leftarrow U_2^\dagger$
11:        $solutions.push((C_I, U, C_F, |\mathcal{B}(C_I^\dagger)| + |U| + |\mathcal{B}(C_F^\dagger)|))$
12:    end while
13:    $C_I, U, C_F, \_ \leftarrow min(solutions)$        ▷ solutions are compared using their last components
14:        return $\mathcal{B}(C_I^\dagger) :: U :: \mathcal{B}(C_F^\dagger)$        ▷ :: stands for circuit concatenation
15: end procedure

METHOD FOR COMPILING A PROGRAM FOR QUANTUM COMPUTER

CROSS-REFERENCE TO RELATED APPLICATIONS

The present application claims priority to European Patent Application EP 22305532.8, filed Apr. 13, 2022, the contents of which are incorporated by reference herein in its entirety.

TECHNICAL FIELD

The invention relates to a method for compiling a program to be executed using a quantum computer, in view of calculating an observable value or sampling a bit string.

BACKGROUND

Optimizing the execution of a calculation which is performed using a quantum computer is an issue when compiling quantum circuits for noisy intermediate scale quantum architectures, also referred to as NISQ architectures. Indeed, these architectures do not have any error correction schemes and are thus subject to errors. The errors mostly come from the imperfection of the implementation of entangling gates, so that reducing the number of the entangling gates that are involved in the calculation is required. As commonly known, entangling gates are unitary operators that cannot be written as tensor products of local unitary operators. Other compilation issues may be reducing a calculation time, reducing separating distances between Josephson junctions that are used within a grid of such junctions in the quantum computer chipset, etc.

Several compilation methods already exist, that optimize the number of entangling gates by exploiting the fact that Clifford operators do not need to be implemented in a quantum processor, but rather can be classically emulated instead, i.e. the Clifford operators can be implemented using a non-quantum computer. For example, one such compilation method is disclosed in publication "Qubit routing via lazy synthesis" by Simon Martiel and Timothée Goubault de Brugière, Nov. 9, 2021, available at arxiv.org/abs/2012.09663.

Generally, these compilation methods address the objective of using a quantum processor to calculate an observable value of the form $<0|U^{\dagger}HU|0>$, where H denotes an observable, U is a quantum circuit and $|0>$ is a qubit base state. The observable H may be described in the Pauli base. The compilation methods mentioned before implement algorithms that transform the quantum circuit U into a new quantum circuit U' such that U equals the product of U' by a Clifford operator C: U=CU'. Then, the observable value $<0|U^{\dagger}HU|0>$ to be calculated becomes $<0|U'^{\dagger}(C^{\dagger}HC)U'|0>$, where $C^{\dagger}HC$ operates as a new observable to be sampled with the state quantum U'$|0>$. The calculation of the new observable $C^{\dagger}HC$ does not need to be carried out inside the quantum processor, and U'$|0>$ just corresponds to a change in the measurement base with respect to U$|0>$. In the whole present description, the exponent character $^{\dagger}$ appended just after an operator denotes the complex conjugate transposition of this operator, in a usual way for the Man of quantum computing. It is assumed that the Clifford group in well-known, composed of so-called Clifford operators. In the particular case of a Clifford operator C, $C^{\dagger}$ is equal to the reverse operator of C. The above replacement of the quantum circuit U with U' using U=CU' may be called final Clifford stripping, since the Clifford operator is to be applied last when the product CU' is applied sequentially to a n-qubit, where n is the number of qubits that are combined through tensor product.

It is also known that applying the same Clifford stripping algorithm to the complex conjugate transposition of the quantum circuit U, namely $U^{\dagger}$, leads to $U^{\dagger}=CU'$, or $U=U'^{\dagger}C^{\dagger}$ corresponding then to an initial Clifford stripping since $C^{\dagger}$ operates first in the product. Then the observable value to calculate can be written in the following way: $<0|U^{\dagger}HU|0>= (<0|C)U'HU'^{\dagger}(C^{\dagger}|0>)$. The quantum state $C^{\dagger}|0>$ as appearing in this latter writing is known as a stabilizer state. By definition, a stabilizer quantum state $|\psi>$ over n qubits is a quantum state such that there exists a subgroup S of the Pauli group over n qubits that contains $2^n$ Pauli operators and such that $P|\psi>=|\psi>$ for any Pauli operator P that belongs to subgroup S. Such stabilizer states are very structured and can be efficiently synthetized. In particular a stabilizer state can be produced using at most $n^2/(\log n)$ entangling gates, where n is again the number of qubits in the system and log denotes the natural logarithm function. Heuristics are known for synthetizing such stabilizer state, starting from a description of the Clifford operator C. All the computational base states are stabilizer states, and all states achieved by starting from $|0 \ldots 0>$ and applying only Clifford operators are also stabilizer states.

Based on this situation, one object of the present invention consists in providing a new compilation method which is more efficient than those already existing, for performing a quantum computer-implemented calculation. In particular, the invention method aims at reducing in a greater extent the number of entangling gates that are involved in the quantum calculation.

BRIEF SUMMARY

For meeting at least this object or others, a first aspect of the present invention proposes a computer-implemented method for compiling a program to be executed using a quantum computer in view of calculating a value of an observable for a final quantum state, when this final quantum state results from a target quantum circuit operating with an initial quantum state. The invention method comprises iterating the following step sequence /i/ to /vii/ after setting an initial matrix and a final matrix both to an identity matrix, and after initializing a stripped quantum circuit with the target quantum circuit:

/i/ transforming the stripped quantum circuit into a first product of a first intermediate quantum circuit by a first Clifford operator;

/ii/ transforming the complex conjugate transposition of the first intermediate quantum circuit into a second product of a second intermediate quantum circuit by a second Clifford operator;

/iii/ calculating a third product of the first Clifford operator by the final matrix as existing before the current iteration, and updating this final matrix with a result of the third product;

/iv/ calculating a fourth product of the second Clifford operator by the initial matrix as existing before the current iteration, and updating this initial matrix with a result of the fourth product;

/v/ updating the stripped quantum circuit with the complex conjugate transposition of the second intermediate quantum circuit;

/vi/ assessing a performance cost relating at least to the updated stripped quantum circuit as resulting from step /v/ of the current iteration and to the complex conjugate transposition of the updated initial matrix as resulting from step /iv/ of the current iteration; and /vii/ storing the updated initial matrix, the updated stripped quantum circuit and the updated final matrix as resulting from steps /iii/ to /v/ of the current iteration, and the performance cost as assessed in step /vi/ of the current iteration.

The invention method further comprises selecting that one of the iterations of steps /i/ to /vii/ that has produced a minimum value for the performance cost, and then, using the updated initial matrix, updated stripped quantum circuit and updated final matrix as resulting from the selected iteration, performing the additional following steps:

/1/ generating a circuit for the quantum computer that corresponds to applying the complex conjugate transposition of the updated initial matrix to a quantum state; and /2/ completing the circuit generated in step /1/ so that the completed circuit applies a fifth product of the complex conjugate transposition of the updated initial matrix by the updated stripped quantum circuit to the quantum state.

Thanks to the invention method, the quantum computer is optimized for participating in calculating the observable value when provided with the completed circuit as resulting from step /2/.

The compiling method of the invention, including steps /i/ to /vii/, /1/ and /2/, is intended to be executed using a classical computer, i.e. non-quantum computer.

Thanks to each initial matrix being a Clifford operator, step /1/ is made easier by the fact that the complex conjugate transposition of the updated initial matrix applied to the initial quantum state is a stabilizer state.

Steps /2/ may be executed through circuit concatenation.

Step /i/ performs a final Clifford stripping of the quantum circuit, and step /ii/ performs an initial Clifford stripping of the first intermediate quantum circuit as resulting from the prior final Clifford stripping. Hence, the invention method combines both final Clifford stripping and initial Clifford stripping in each iteration of the step sequence. Thanks to this combination, it is more efficient in reducing the performance cost. Thus, the number of iterations of the sequence of steps /i/ to /vii/ may be low. Typically, this iteration number may be between 2 and 50, and even between 5 and 20.

In particular, the invention method may be used for reducing efficiently the number of entangling gates in the quantum computer to be used. A rate of errors in the execution of the program by the quantum computer can thus be reduced, providing improved reliability to the program result.

For such implementations of the invention where the observable value is to be calculated, in step /vi/ for each iteration of the sequence of steps /i/ to /vii/, the performance cost may be assessed as a sum of a first implementation cost relating to the updated stripped quantum circuit and a second implementation cost relating to the complex conjugate transposition of the updated initial matrix. These first and second implementation costs may increase with the number of entangling gates that are involved for implementing the updated stripped quantum circuit and the complex conjugate transposition of the initial matrix, respectively. Possibly, they may also increase with other parameters such as separating distances existing between junctions that are used within a grid of Josephson junctions in the quantum computer, a calculation time, an error rate of the program, etc. In particular, each implementation cost may equal the number of entangling gates of the corresponding quantum circuit.

For performing the calculation of the observable value, the method may further comprise:

/3/ using the quantum computer provided with the completed circuit as resulting from step /2/, applying the fifth product to the initial quantum state;

/4/ calculating a sixth product of the updated final matrix by the observable and by the complex conjugate transposition of the updated final matrix as resulting from the selected iteration of steps /i/ to /vii/; and then /5/ calculating the observable value by replacing the final quantum state with a result of step /3/, and replacing the observable (H) with a result of step /4/.

Step /4/ may be executed using a classical computer, i.e. non-quantum computer, and step /5/ may be computed by the quantum computer or both the classical and quantum computers in combination.

Thanks to the reduction of the performance cost as allowed by the repetitions of the sequence of steps /i/ to /ii/, the reliability of the result obtained for the observable value is improved.

Instead of calculating an observable value, the invention method may be applied to sampling a bit string out of the final quantum state. The sequence of steps /i/ to /vii/ is the same as before, but the sampling of the bit string involves the complex conjugate transposition of the updated final matrix in addition to the updated stripped quantum circuit and the complex conjugate transposition of the updated initial matrix. Therefore, the performance cost is to be assessed in step /vi/ of each iteration of the sequence of steps /i/ to /vii/ also taking into account the complex conjugate transposition of the updated final matrix as resulting from step /iii/ of this iteration.

The invention advantages mentioned above for the case of observable value calculation apply identically to the present case of bit string sampling. In particular, the iteration number of the sequence of steps /i/ to /vii/ may again be between 2 and 50, advantageously between 5 and 20.

For bit strip sampling, the invention method also comprises the following additional steps /1'/ and /2'/ further to steps /1/ and /2/, using the updated final matrix and the updated initial matrix as resulting from the selected iteration:

/1'/ generating another circuit for the quantum computer that corresponds to applying the complex conjugate transposition of the updated final matrix to the quantum state; and /2'/ further completing the circuit generated in step /2/ with the another circuit generated in step /1'/, so that the further-completed circuit applies a completed fifth product of the complex conjugate transposition of the updated initial matrix by the updated stripped quantum circuit and by the complex conjugate transposition of the updated final matrix to the quantum state.

In this way, the quantum computer is optimized for participating in sampling the bit string when provided with the completed circuit as resulting from step /2'/.

Steps /1'/ and /2'/ are also to be executed by the classical computer.

For such application of the invention to bit string sampling, the performance cost assessed in step /vi/ of each iteration of the sequence of steps /i/ to /vii/ may be the sum of the first and second implementation costs plus a third one relating to the complex conjugate transposition of the updated final matrix. In a similar way to the first and second implementation costs, the third one may also increase with the number of entangling gates that are involved for implementing the complex conjugate transposition of the final matrix, and possibly also increase with the separating distances existing between Josephson junctions used in the quantum computer, the calculation time, the error rate of the program, etc. In particular, the third implementation cost, namely that related to implementing the complex conjugate transposition of the final matrix, may equal the number of entangling gates in the corresponding quantum circuit.

For performing bit string sampling, the method may further comprise, using the updated final matrix, the updated initial matrix and the updated stripped circuit as resulting from the selected iteration of steps /i/ to /vii/:

/3'/ using the quantum computer provided with the further-completed circuit as resulting from step /2'/, applying the completed fifth product to the initial quantum state;

/4'/ calculating a sixth product of the updated final matrix by a sampling operator acting on an i-th qubit within an n-qubit, n being a non-zero positive integer, and by the complex conjugate transposition of the updated final matrix; and then /5'/ sampling the bit string out of a quantum state that results from the sixth product as obtained in step /4'/ and applied to a result obtained in step /3'/ for the completed fifth product applied to the initial quantum state.

Step /4'/ may be executed using the classical computer, i.e. non-quantum computer, and step /5'/ may be executed by the quantum computer or both the classical and quantum computers in combination.

Preferably, for allowing sampling all the qubits from one and same n-qubit, a diagonalizing Clifford operator may be implemented in the following manner:

the so-called another circuit generated in step /1'/ for the quantum computer may correspond to applying a product of the complex conjugate transposition of the updated final matrix by a diagonalizing Clifford operator to the quantum state; and the sixth product calculated in step /4'/ may be completed in a first factor position with a complex conjugate transposition of the diagonalizing Clifford operator, and in a last factor position with the diagonalizing Clifford operator.

For such implementation, the diagonalizing Clifford operator is selected so that the completed sixth product is a diagonal operator. The diagonalizing Clifford operator may be generated by the classical computer and executed on the quantum computer.

Possibly, step /5'/ may comprise the following substeps, using the updated final matrix, the updated initial matrix and the updated stripped circuit as resulting from the selected iteration of steps /i/ to /vii/:

/5'-1/ determining an emulating matrix to be applied on a bit string that results from sampling the completed fifth product applied to the initial quantum state, and which is equivalent to using the completed sixth product; and /5'-2/ applying the emulating matrix to a bit string obtained by sampling the completed fifth product multiplied by the diagonalizing Clifford operator and applied to the initial quantum state, thereby providing the bit string sampled out of the final quantum state.

Substeps /5'-1/ and /5'-2/ can be executed by the classical computer, i.e. the quantum operation of the completed sixth product is emulated classically.

Generally for the invention, the observable value or the sampled bit string may be useful in an application pertaining to at least one field selected among chemistry including quantum chemistry, biochemistry, medicines, physics including quantum physics, biophysics, combinatorial optimization, applications based on artificial intelligence, etc.

In particular, the observable may be one among an energy of a molecule, an evaluation of a combinatorial cost function on a superposition of solutions, etc.

A second aspect of the invention proposes a computer program product that comprises instructions for executing the method of the first invention aspect, when this computer program product is implemented by a computer. This computer may be a classical one, i.e. non-quantum, for executing at least the steps /i/ to /vii/, /1/, /2/, /1'/, /2'/, and /4/ or /4'/. When the program is executed by the quantum computer, it comprises at least step /3/ or /3'/.

BRIEF DESCRIPTION OF THE DRAWINGS

FIG. 1 exhibits a possible algorithm suitable for implementing the invention method in view of calculating an observable value, referred to as Algorithm 1;

FIG. 3 exhibits a modified version of Algorithm 1 in view of sampling a bit string, referred to as Algorithm 2;

DETAILED DESCRIPTION

Figure 2:
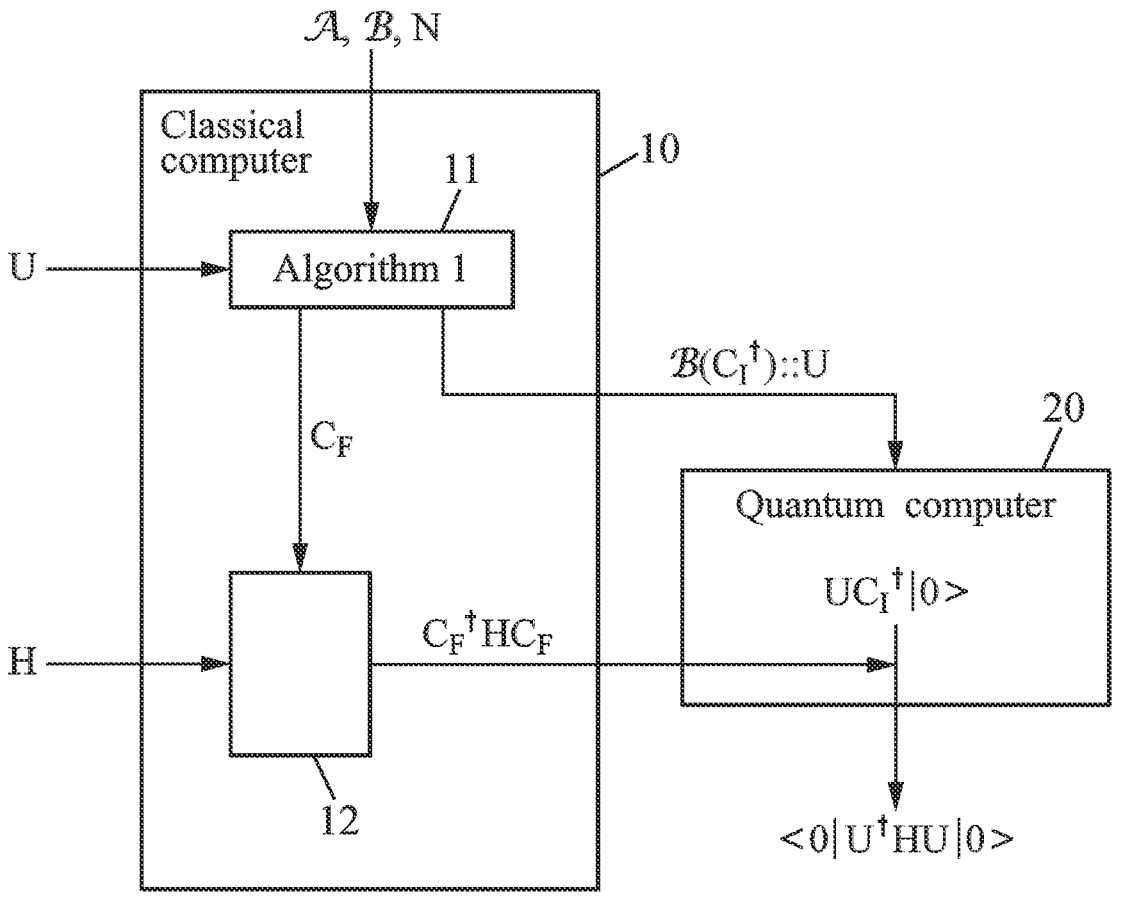
FIG. 2 is a block-diagram that illustrates an implementation of the invention for calculating an observable value.

In the present description, the quantum base state |0> is taken by convention as an initial quantum state to be used for the invention, but it may be replaced by the quantum base state |1> or any other quantum state which is preferably a stabilizer state. The quantum states considered herein are n-qubits except indicated otherwise, where n is the number of qubits used for the quantum calculation through tensor product, also commonly called number of particles in the system.

Also generally in the present description, quantum computer denotes an actual quantum computer but may also denote an emulated quantum computer which is implemented on a classical, i.e. non-quantum, computer.

The invention is first described with reference to FIG. 1 in the case of calculating an observable value. As an example, the observable H is a molecule energy value, corresponding to a Hamiltonian operating as a quantum operator. Calculating the observable value is then referred to as energy sampling by the Man skilled in quantum computation. The observable H may be described in the Pauli base. Then, in a well-known manner, the observable value is $<0|U^{\dagger}HU|0>$, where U denotes a quantum circuit, herein called target quantum circuit. In this context, U|0> is the final quantum state that results from the quantum circuit U operating with the initial quantum state |0>. As a reminder, $U^{\dagger}$ is the complex conjugate transposition of the quantum circuit U.

For connexion with the general part of the present description, the following notations are used in the pseudocode of FIG. 1:

letter A (in freestyle cap font in the figure) denotes a first algorithm that simplifies a quantum circuit Y into the product CY', where C is a Clifford operator and Y' is a new quantum circuit. This first algorithm A performs final Clifford stripping as described above and is adapted to be implemented by a classical computer, i.e. non-quantum computer. It is commonly called "compilation algorithm" in the art letter B (in freestyle cap font in the figure) denotes a second algorithm that, when executed from a Clifford operator C, produces a circuit suitable for applying the operator C to a quantum state. In the art, one says that algorithm B produces a circuit that prepares the quantum state $C|0>$. The second algorithm B is commonly called "stabilizer state synthesis algorithm". It is also adapted to be implemented by a non-quantum computer N number of repetitions for executing the sequence of lines 6 to 11 of the pseudo-code C1, C2 first and second Clifford operators, respectively U1, U2 first and second intermediate quantum circuits, respectively CI, CF initial and final matrices, respectively $|X|$ implementation cost of the circuit that produces operator X. The implementation cost may be defined as an increasing function of the number of entangling gates of the circuit X, and possibly also increasing with respect to other parameters in a manner well-known in the art In identity operator for dimension number equal to 2n The successive lines of the pseudo-code of Algorithm 1 as displayed in FIG. 1 have the following meanings, assuming that the target quantum operator U is stored as an initial value of an algorithm parameter which is also denoted U for easiness:

lines 2 and 3: initializing of both the initial matrix $C_I$ and the final matrix $C_F$ to the identity matrix $I_n$ line 4: creating a list named "solutions", intended to store solution results produced by each iteration of the sequence of lines 6 to 11 line 5: start of iteration loop containing the sequence of lines 6 to 11 line 6: final Clifford stripping applied to the quantum operator U, using the first algorithm A and corresponding to step /i/ in the general part of the present description, leading to so-called first product $C_1U_1$ equaling U: $U=C_1U_1$ line 7: initial Clifford stripping applied to the quantum operator $U_1$, using again the first algorithm A but with $U_1^\dagger$ and corresponding to step /ii/ in the general part of the present description, leading to $U_2^\dagger C_2^\dagger$ equaling $U_1$: $U_1=U_2^\dagger C_2^\dagger$, with $C_2U_2$ called second product line 8: calculation of the product $C_FC_1$, called third product, and updating $C_F$ with the result of this third product, corresponding to step /iii/ in the general part of the present description line 9: calculation of the product $C_IC_2$, called fourth product, and updating $C_I$ with the result of this fourth product, corresponding to step /iv/ in the general part of the present description line 10: updating U with $U_2^\dagger$, corresponding to step /v/ in the general part of the present description. The algorithm parameter U thus corresponds to the target quantum operator being progressively stripped, and is called stripped quantum operator line 11: adding into a storage the results for $C_I$, U, $C_F$ and also a performance cost that is the sum of the respective implementation costs of the updated stripped quantum circuit U and the circuit provided by applying the second algorithm B to $C_I^\dagger$, corresponding to steps /vi/ and /vii/ in the general part of the present description line 12: end of the loop once the prescribed N iterations of the sequence of lines 6 to 11 have been completed line 13: after the N iterations have been completed, selecting from the storage the minimum value for the performance cost that has been obtained among the N iterations, and recovering the results for $C_I$, U and $C_F$ that have been obtained for the iteration of the minimum performance cost value line 14: using the second algorithm B for producing a circuit that is suitable for applying the operator $C_I^\dagger$ to a quantum state, and combining this circuit with the stripped quantum circuit U, for both $C_I$ and U corresponding to minimum performance cost value. Such circuit combination may be implemented as a circuit concatenation, so that the stripped quantum circuit U acts last. This corresponds to steps /1/ and /2/ in the general part of the present description At this stage, the program for calculating the observable value has been compiled in an optimized manner for reducing the number of entangling gates.

After each iteration of the sequence of lines 6 to 11, the observable value $<0|U^\dagger HU|0>$ with U being initially the target quantum circuit, equals to $(<0|C_I)U^\dagger(C_F^\dagger HC_F)U(C_I^\dagger|0>)$ with $C_F$, U and $C_I$ now as recovered upon executing line 13. All $C_I$- and $C_F$ matrices involved in the successive iterations are Clifford operators too.

Then a quantum computer is provided with the circuit combination produced upon executing line 14. The quantum computer thus obtained suits for calculating the observable value while implementing minimum number of entangling gates.

Thereafter, for performing the calculation of the observable value for the initial quantum state $|0>$, one uses the quantum computer with the initial quantum state $|0>$ (step /3/ of the general part of the present description). It returns then $UC_I^\dagger|0>$, $UC_I^\dagger$ called fifth product.

A non-quantum computer is used in addition to compute the operator $C_F^\dagger HC_F$, called sixth product (step /4/ of the general part of the present description).

Finally, combining the results delivered by the quantum computer for $UC_I^\dagger|0>$ and by the non-quantum computer for $C_F^\dagger HC_F$ provides the result of the energy sampling.

Such implementation that includes compilation and calculation is illustrated in FIG. 2. Reference numbers 10 and 20 denote a classical computer and a quantum computer, respectively. Within the classical computer 10, reference number 11 denotes a first module that executes Algorithm 1, and 12 a second module that executes calculation of the product $C_F^\dagger HC_F$. First algorithm A, second algorithm B and number N have been imported previously into module 11, and the target quantum circuit U and the observable H are inputted into the modules 11 and 12, respectively. Module 12 receives the final operator $C_F$ from module 11, as this final operator $C_F$ results from the selected iteration of the lines 6 to 11. Module 12 then calculates the product $C_F^\dagger HC_F$ and transmits it to the quantum computer 20. In parallel, the quantum computer 20 is provided with the completed circuit from module 11, based on the stripped quantum circuit U and the initial matrix $C_I$ as also resulting from the selected iteration of the lines 6 to 11. The quantum computer 20 calculates the quantum state $UC_I^\dagger|0>$, and uses this latter for sampling the product $C_F^\dagger HC_F$ in order to deliver the result for the observable value $<0|U^\dagger HU|0>$. In such implementation, compilation is executed by module 11, and the remaining which is spilt between the classical computer 10 and the quantum computer 20 is the calculation of the observable value.

In a known manner, the final quantum state $U|0>$ is comprised of n qubits which are combined through tensor product and thus form a n-qubit. Characterization of this n-qubit produces a bit string of n bits. The issue may also be sampling the bit string, and appropriate compilation for this is provided by the algorithm displayed in FIG. 3 (Algorithm 2). The only difference with that of FIG. 1 (Algorithm 1) is that the circuit returned upon executing line 14 is suitable for applying the product $C_F{}^\dagger UC_I{}^\dagger$ instead of $UC_I{}^\dagger$ to the initial quantum state $|0>$. Therefore, the implementation cost of the circuit that applies $C_F{}^\dagger$ is to be further added into the performance cost as calculated in line 11.

After each iteration of the sequence of lines 6 to 11, the sampling of the bit string is to be performed out of the quantum state $C_F(C_F{}^\dagger Z_i C_F)C_F{}^\dagger UC_I{}^\dagger|0>$, where $Z_i$ denotes the sampling operator acting on qubit i only, also commonly noted $\sigma z^{(i)}$, where $\sigma z$ is the 2×2 Z-Pauli matrix and integer i is comprised between 1 and n, both limits 1 and n included. Thus, sampling the final quantum state $U|0>$ with sampling operator $Z_i$ is equivalent to sampling the quantum state $C_F{}^\dagger UC_I{}^\dagger|0>$ with operator $C_F{}^\dagger Z_i C_F$ using $C_F$, U and $C_I$ as recovered upon executing algorithm line 13.

However, for allowing sampling of each of the n qubits out of the n-qubit, it is necessary to replace the operators $C_F{}^\dagger Z_i C_F$ with i varying from 1 to n by other operators that are all diagonal. This is obtained by using a diagonalizing Clifford operator $C_{diag}$ such that the operators to be used are now $C_{diag}(C_F{}^\dagger Z_i C_F)C_{diag}{}^\dagger$ which are diagonal. Such diagonal operators are then to be used with the modified quantum state $C_{diag}C_F{}^\dagger UC_I{}^\dagger|0>$. The diagonalizing Clifford operator $C_{diag}$ exists because all the operators considered commute and thus can be diagonalized in one and same base. The Man skilled in the art knows how to select the diagonalizing Clifford operator $C_{diag}$. In particular, theory provides that this diagonalizing Clifford operator $C_{diag}$ can be obtained by applying the second algorithm B to the final matrix $C_F{}^\dagger$. Indeed, one can show that any synthesis procedure constructing a circuit that prepares a stabilizer state can be used to co-diagonalize a family of Pauli operators.

As a result, sampling each operator $Z_i$ on the final state $U|0>$ with U being the target quantum circuit is equivalent to sampling the operator $D_i=C_{diag}(C_F{}^\dagger Z_i C_F)C_{diag}{}^\dagger$ on the quantum state $C_{diag}C_F{}^\dagger UC_I{}^\dagger|0>$, Di being a diagonal Pauli operator. In this statement, equivalency means that the statistics that result separately from both sampling operations are the same. In this way, $<0|U^\dagger Z_i U|0>=<0|C_I U^\dagger C_F C_{diag}{}^\dagger D_i C_{diag}C_F{}^\dagger UC_I{}^\dagger|0>$.

Figures 4A, 4B:
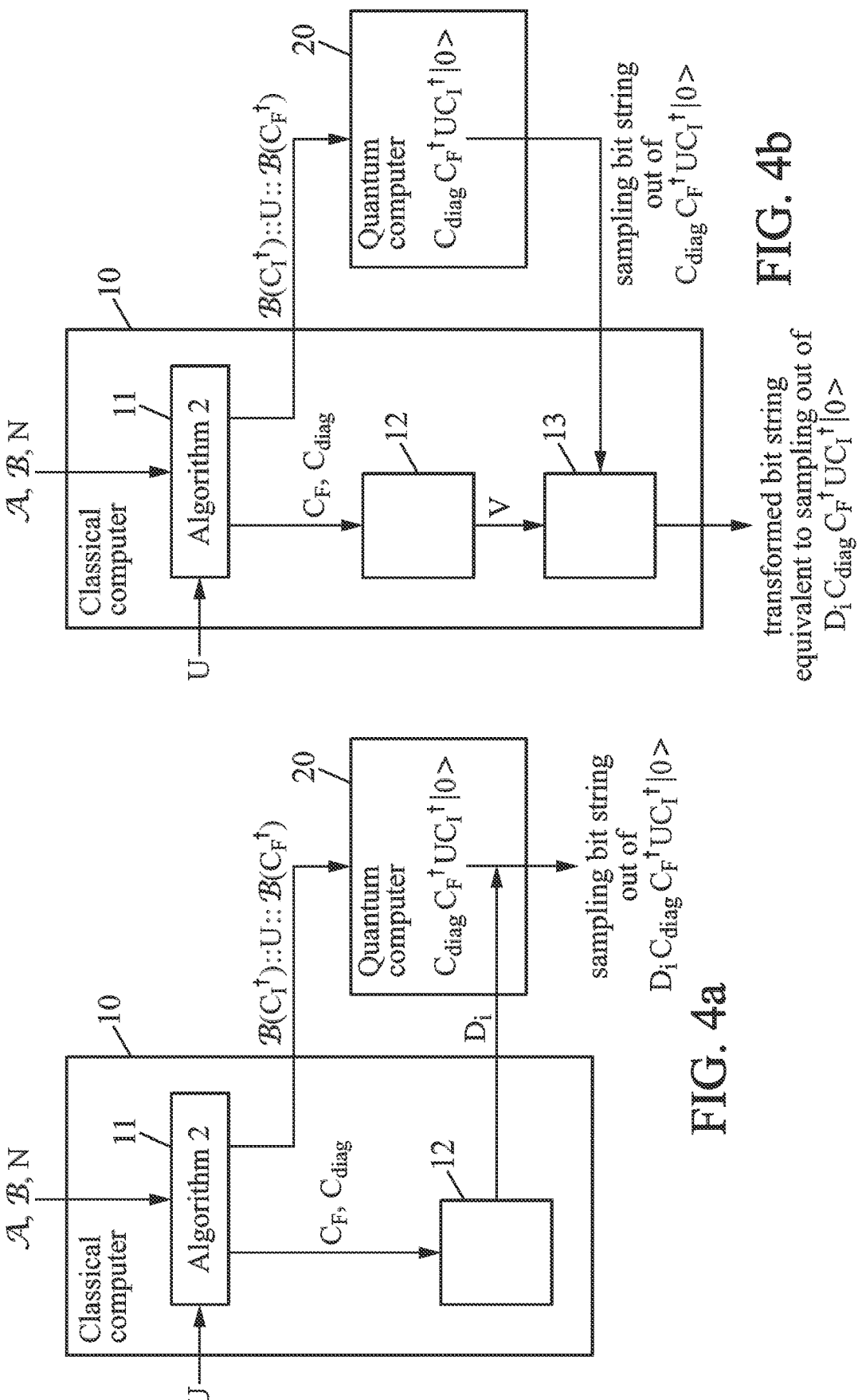
FIG. 4a corresponds to FIG. 2 for bit string sampling, according to a first implementation of the invention.
FIG. 4b corresponds to FIG. 4a for a second implementation of the invention, again for bit string sampling.

As shown in FIG. 4a which relates to bit string sampling instead of energy sampling, the quantum computer 20 is thus to be provided with a completed circuit suitable for applying $C_{diag}C_F{}^\dagger UC_I{}^\dagger$ to the initial state $|0>$. To this end, the module 11 within the classical computer 10 now executes Algorithm 2 of FIG. 3, where the second algorithm B is also implemented with the operator $C_F{}^\dagger$ (step /1'/ in the general part of the present description), and circuit concatenation is implemented with the circuit corresponding to $C_I{}^\dagger$ followed with that corresponding to U as before, but now further followed with that corresponding to $C_F{}^\dagger$ (step /2'/ in the general part of the present description). The resulting circuit is provided by the module 11 to the quantum computer 20, so that this latter produces the quantum state $C_{diag}C_F{}^\dagger UC_I{}^\dagger|0>$, $C_F{}^\dagger UC_I{}^\dagger$ called completed fifth product (step /3'/ in the general part of the present description). The module 12 of the non-quantum computer 10 is used separately to compute the operator $D_i=C_{diag}(C_F{}^\dagger Z_i C_F)C_{diag}{}^\dagger$ (step /4'/ of the general part of the present description). Operator $D_i$ is transmitted to the quantum computer 20 for being applied to the state $C_{diag}C_F{}^\dagger UC_I{}^\dagger|0>$, and the resulting state sampled on the computation state base. Reading of the sampled value for qubit i and gathering the values thus obtained for i from 1 to n provides the sampled bit string (step /5'/ in the general part of the present description).

However, practically it may be difficult reading simultaneously all the sampled values out of the same quantum state $D_i C_{diag}C_F{}^\dagger UC_I{}^\dagger|0>$ for i from 1 to n. Instead, the $D_i$-operators may be emulated by the classical computer 10 from the bit string sampled out of the quantum state $C_{diag}C_F{}^\dagger UC_I{}^\dagger|0>$. In this way, correlations between the sampled values of the bit string are restored. Such emulation may be performed in the following way:

the n $D_i$-operators are computed by module 12 as before, and considering that each of these $D_i$-operators is a tensor product of 2×2 identity operators and 2×2 Z-Pauli operators without phase change, the module 12 further constructs a row n-vector $V_{Di}$ for each $D_i$-operator with j-th coordinate of $v_{Di}$ equal to 0 if $D_i$ acts on the j-th qubit as the 2×2 identity operator, or equal to 1 if $D_i$ acts on the j-th qubit as the 2×2 Z-Pauli operator;

a n×n matrix V is constructed by arranging the n row n-vector $v_{Di}$ one below the other in the order from 1 to n. the matrix V is transmitted by module 12 to module 13;

by the classical computer 10, recovering from the quantum computer 20 the bit string that corresponds to the sampling of $C_{diag}C_F{}^\dagger UC_I{}^\dagger|0>$ on the computation state base, and computing the result of matrix V applied to this bit string. The resulting new bit string then corresponds to the sampling of each $Z_i$-operator on the final quantum state $U|0>$ with U therein being the target quantum circuit. Such emulation of the $D_i$-operators is performed by module 13 of the classical computer 10, because each $D_i$-operator performs a "count" (modulo 2) of parity of some subset of the n qubits, which is equivalent to computing the dot-product of the n-vector $V_{Di}$ with the bit string sampled out of the quantum state $C_{diag}C_F{}^\dagger UC_I{}^\dagger|0>$. Indeed, each $D_i$-operator acts as a product of the Z-Pauli operator on a subset of qubits $S_i$ and as the identity operator on the other qubits. This entails that $D_i$-operator will take value 1 (resp. −1) if there is an even (resp. odd) number of qubits in state $|1>$ in subset $S_i$. Therefore, one can (1) measure all the qubits and (2) deduce the value of $D_i$ by computing the parity of the (now classical) bits corresponding to qubits in the subset $S_i$. This is mathematically equivalent to computing the dot-product of the measured vector of bits with vector $V_{Di}$.

Such invention implementation for bit string sampling is shown in FIG. 4b.

Figure 5:
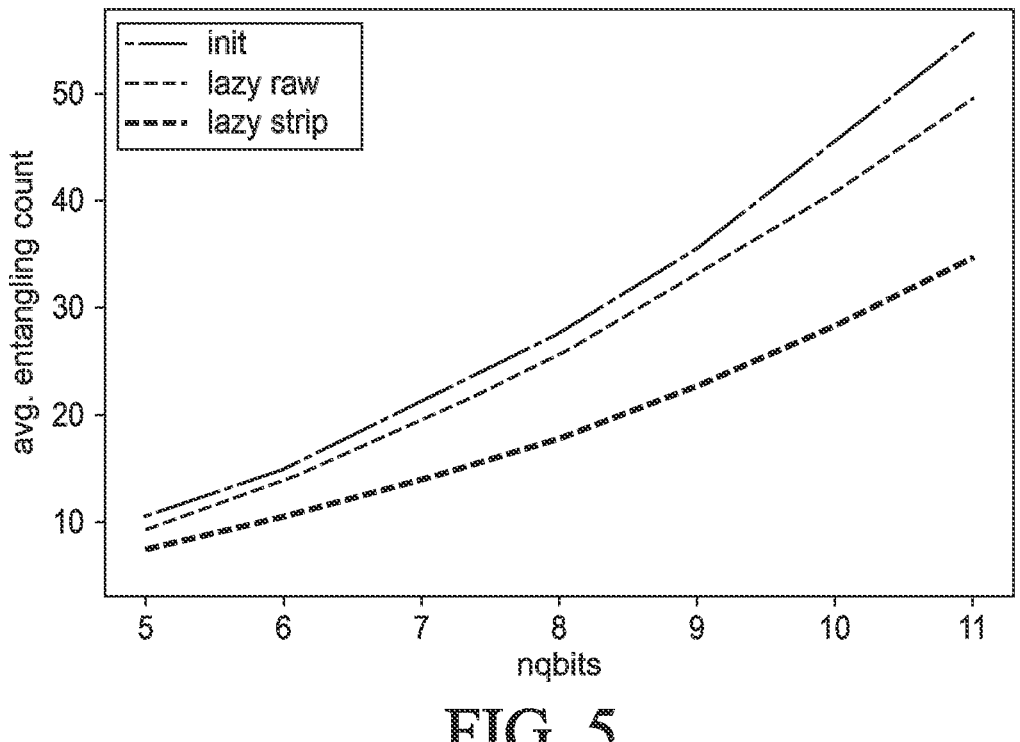
FIG. 5 is a diagram that illustrates an invention efficiency in reducing a number of entangling gates.

The diagram of FIG. 5 compares the numbers of entangling gates that are used within the quantum computer 20 for one same target quantum circuit U, for example in view of calculating an observable value, and for the following implementations:

curve labelled "init": without implementing any method for reducing the number of entangling gates;

curve labelled "lazy raw": with implementation of the first algorithm A as disclosed in publication "Qubit routing via lazy synthesis" by Simon Martiel and Timothée Goubault de Brugière, Nov. 9, 2021, available at arxiv.org/abs/2012.09663, but without the invention algorithm 1; and curve labelled "lazy strip": with same implementation of the first algorithm A as for curve labelled "lazy raw", but in combination with the invention algorithm 1.

The vertical axis indicates the numbers of entangling gates, and the horizontal axis indicates the number n of qubits which are combined through tensor product. It is clear that algorithm 1 leads to further reduction in the number of entangling gates in each case.

What is claimed is:

1. A computer-implemented method for compiling a program to be executed using a quantum computer in view of calculating a value of an observable for a final quantum state, or for sampling a bit string out the final quantum state, said final quantum state resulting from a target quantum circuit operating with an initial quantum state, said method comprising iterating step sequence /i/ to /vii/ after setting an initial matrix and a final matrix both to an identity matrix, and after initializing a stripped quantum circuit with the target quantum circuit:

/i/ transforming the stripped quantum circuit into a first product of a first intermediate quantum circuit by a first Clifford operator;

/ii/ transforming a complex conjugate transposition of the first intermediate quantum circuit into a second product of a second intermediate quantum circuit by a second Clifford operator;

/iii/ calculating a third product of the first Clifford operator by the final matrix as existing before the current iteration, and updating said final matrix with a result of the third product;

/iv/ calculating a fourth product of the second Clifford operator by the initial matrix as existing before the current iteration, and updating said initial matrix with a result of the fourth product;

/v/ updating the stripped quantum circuit with a complex conjugate transposition of the second intermediate quantum circuit;

/vi/ assessing a performance cost relating at least to the updated stripped quantum circuit as resulting from step /v/ of the current iteration and to a complex conjugate transposition of the updated initial matrix as resulting from step /v/ of said current iteration; and /vii/ storing the updated initial matrix, the updated stripped quantum circuit and the updated final matrix as resulting from steps /iii/ to /v/ of the current iteration, and the performance cost as assessed in step /vi/ of said current iteration, the method further comprising selecting that one of the iterations of steps /i/ to /vii/ that has produced a minimum value for the performance cost, and then, using the updated initial matrix, updated stripped quantum circuit and updated final matrix as resulting from the selected iteration, performing additional steps /1/ and /2/:

/1/ generating a circuit for the quantum computer that corresponds to applying the complex conjugate transposition of the updated initial matrix to a quantum state; and /2/ completing the circuit generated in step /1/ so that the completed circuit applies a fifth product of the complex conjugate transposition of the updated initial matrix by the updated stripped quantum circuit to the quantum state, and when in view of sampling the bit string, the performance cost assessed in step /vi/ of each iteration of the sequence of steps /i/ to /vii/ further relates to a complex conjugate transposition of the updated final matrix as resulting from step /iii/ of said iteration, and the method also comprising additional steps /1'/ and /2'/ further to steps /1/ and /2/, using the updated final matrix and the updated initial matrix as resulting from the selected iteration:

/1'/ generating another circuit for the quantum computer that corresponds to applying a complex conjugate transposition of the updated final matrix to the quantum state; and /2'/ further completing the circuit generated in step /2/ with said another circuit generated in step /1'/, so that the further-completed circuit applies a completed fifth product of the complex conjugate transposition of the updated initial matrix by the updated stripped quantum circuit and by the complex conjugate transposition of the updated final matrix to the quantum state, so that the quantum computer is optimized for participating in calculating the observable value when provided with the completed circuit as resulting from step /2/, or for participating in sampling the bit string when provided with the completed circuit as resulting from step /2'/.

2. The method of claim 1, wherein in step /vi/ for each iteration of the sequence of steps /i/ to /vii/:

when in view of calculating the observable value, the performance cost is assessed as a sum of a first implementation cost relating to the updated stripped quantum circuit and a second implementation cost relating to the complex conjugate transposition of the updated initial matrix; or when in view of sampling the bit string, the performance cost is assessed as a sum of the first implementation cost and the second implementation cost and a third implementation cost relating to the complex conjugate transposition of the updated final matrix.

3. The method of claim 2, wherein each of the first and second implementation costs, and the third implementation cost if any, increases with a number of entangling gates that are involved for implementing the updated stripped quantum circuit, the complex conjugate transposition of the initial matrix, and the complex conjugate transposition of the final matrix, respectively, and possibly also increases with at least one among separating distances existing between used junctions within a grid of Josephson junctions in the quantum computer, a calculation time and an error rate of the program.

4. The method of claim 1, wherein when in view of calculating the observable value, said method further comprises:

/3/ using the quantum computer provided with the completed circuit as resulting from step /2/, applying the fifth product to the initial quantum state;

/4/ calculating a sixth product of the updated final matrix by the observable and by the complex conjugate transposition of said updated final matrix, using the updated final matrix as resulting from the selected iteration of steps /i/ to /vii/; and then /5/ calculating the observable value by replacing the final quantum state with a result of step /3/, and replacing the observable with a result of step /4/.

5. The method of claim 1, wherein when in view of sampling the bit string, said method further comprises, using the updated final matrix, the updated initial matrix and the updated stripped circuit as resulting from the selected iteration of steps /i/ to /vii/:

/3'/ using the quantum computer provided with the further-completed circuit as resulting from step /2'/, applying the completed fifth product to the initial quantum state;

/4'/ calculating a sixth product of the updated final matrix by a sampling operator acting on an i-th qubit within an n-qubit, n being a non-zero positive integer, and by the complex conjugate transposition of said updated final matrix; and then /5'/ sampling the bit string out of a quantum state that results from the sixth product as obtained in step /4'/ and applied to a result obtained in step /3'/ for the completed fifth product applied to the initial quantum state.

6. The method of claim 5, wherein in view of sampling the bit string:

said another circuit generated in step /1'/ for the quantum computer corresponds to applying a product of the complex conjugate transposition of the updated final matrix by a diagonalizing Clifford operator to the quantum state; and the sixth product calculated in step /4'/ is completed in a first factor position with a complex conjugate transposition of the diagonalizing Clifford operator, and in a last factor position with said diagonalizing Clifford operator, wherein said diagonalizing Clifford operator is selected so that the completed sixth product is a diagonal operator.

7. The method of claim 6, wherein step /5'/ comprises the following substeps, using the updated final matrix, the updated initial matrix and the updated stripped circuit as resulting from the selected iteration of steps /i/ to /vii/:

/5'-1/ determining an emulating matrix to be applied on a bit string that results from sampling the completed fifth product applied to the initial quantum state, and which is equivalent to using the completed sixth product; and /5'-2/ applying the emulating matrix to a bit string obtained by sampling the completed fifth product multiplied by the diagonalizing Clifford operator and applied to the initial quantum state, thereby providing the bit string sampled out of the final quantum state.

8. The method of claim 1, wherein an iteration number of the sequence of steps /i/ to /vii/ is between 2 and 50, preferably between 5 and 20.

9. The method of any one of claim 1, wherein the observable value or the sampled bit string is useful in an application pertaining to at least one field selected among chemistry including quantum chemistry, biochemistry, medicines, physics including quantum physics, biophysics, combinatorial optimization and applications based on artificial intelligence.

10. The method of claim 9, wherein the observable is an energy of a molecule or an evaluation of a combinatorial cost function on a superposition of solutions.

11. A computer program product, comprising instructions for executing the method of claim 1, when said computer program product is implemented by a computer.

* * * * *